United States Patent Office 2,813,850
Patented Nov. 19, 1957

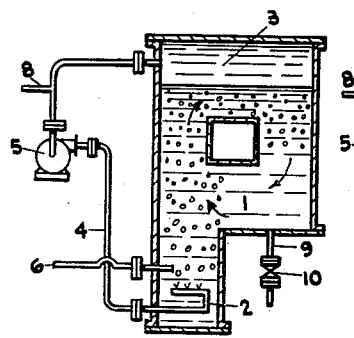
Fig. I
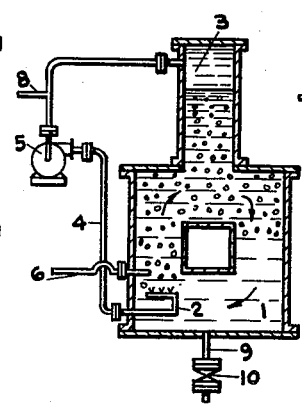
Fig. II
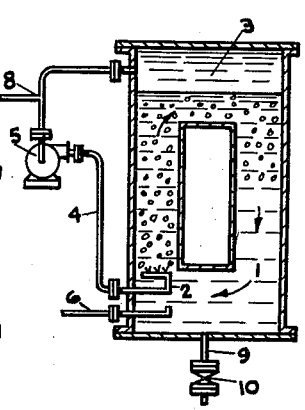
Fig. III
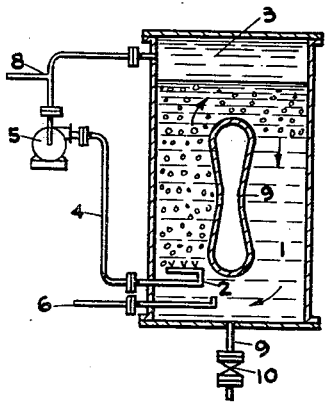
Fig. IV
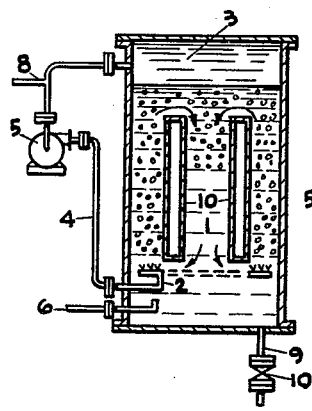
Fig. V
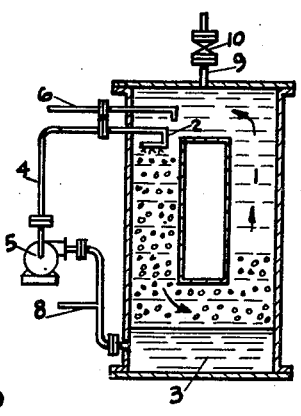
Fig. VI
Inventors: Christiaan Pieter Van Dijk
Franciscus Fredericus Van Der Plas
By Their Attorney:

2,813,850
PROCESS FOR POLYMERIZING UNSATURATED COMPOUNDS IN AN AQUEOUS MEDIUM

Christiaan Pieter van Dijk and Franciscus Johannes Fredericus van der Plas, Amsterdam, Netherlands, assignors to Shell Development Company, Emeryville, Calif., a corporation of Delaware Application January 7, 1952, Serial No. 265,302

Claims priority, application Netherlands January 17, 1951

7 Claims. (Cl. 260—92.8)

This invention relates to a process for polymerizing unsaturated compounds, and more particularly, to an improved process for polymerizing ethylenically unsaturated compounds in an aqueous medium.

Specifically, the invention provides a new process for polymerizing substantially water-insoluble ethylenically unsaturated compounds in an aqueous medium which process has improved operating efficiency and yields polymers having superior mechanical properties. The improvement in efficiency and quality of product is obtained by adding drops of the unsaturated compound to an aqeous medium which contains a polymerization catalyst and is being maintained at a polymerizing temperature under such conditions that the drops of monomer rise or fall through the medium due to the difference in density of the drops and the medium and are subsequently collected as a separate phase in contact with but above or below the aqueous medium, and at the same time continuously circulating the aqueous medium in a substantially vertical plane, the movement of the aqueous medium above or near the point of introducing the drops preferably being in substantially the same direction as the movement of the drops of monomer.

In our copending application, Serial No. 201,536, filed December 19, 1950, now U. S. Patent No. 2,618,626, there is described and claimed a process for polymerizing substantially water-insoluble compounds in an aqueous medium which comprises conducting drops of the compound in contact with and through a liquid medium which contains a polymerization catalyst and is being maintained at a polymerizing temperature. The monomer drops that pass through the aqueous medium are then collected into a separate phase and transported outside the chamber filled with the aqueous phase back to the point of supply for the drops.

The process described in our above-mentioned copending patent application presents many important advantages over known polymerization methods. The process permits, for example, better control over the reaction temperature as the heat of reaction may be removed by cooling the externally circulated monomer rather than by cooling the walls of the reaction chamber itself. Secondly, the unique step of circulating the monomer drops through the reaction mixture avoids the necessity of using mechanical stirring and this in turn decreases or eliminates the formation of polymer deposits on the walls of the reaction chamber. Furthermore, the passage of monomer drops through the water provides better control over the concentration of monomer in the water phase.

There are, however, certain features of the process described in the copending application that tend to reduce its operating efficiency. It has been found, for example, that in some instances the passage of the monomer drops from the aqueous phase to the monomer phase is rather slow and this causes a considerable reduction in the amount of polymer formed per unit time.

In addition, it has been found that there are certain locations in the reaction zone, and particularly those behind or near the device for introducing the monomer drops, where the saturation with the monomer is insufficient. The presence of these "dead spaces" not only tends to decrease efficiency of the process but gives rise to the formation of products having rather poor mechanical properties.

It is an object of the invention, therefore, to provide an improved method for polymerizing substantially water-insoluble ethylenically unsaturated compounds in an aqueous medium. It is a further object to provide a process for polymerizing unsaturated compounds in an aqueous medium that permits an increased rate of formation of polymer. It is a further object to provide a process for polymerizing unsaturated compounds by passing monomer drops through the aqueous medium which process has improved means for speeding the collection of the drops in a monomer phase at the end of their passage through the medium. It is a further object to provide a process for polymerizing unsaturated compounds in an aqueous medium that yields products having improved mechanical properties. It is a further object to provide a process for preparing homogeneous copolymers in an aqueous medium. These and other objects of the invention will be understood from the following detailed description thereof and from the accompanying drawing wherein Figs. I to VI are diagrammatic representations of various apparatus that may be used in carrying out the process of the invention.

It has now been discovered that these and other objects are accomplished by the process of the present invention which comprises adding drops of the substantially water-insoluble ethylenically unsaturated compounds to an aqueous medium containing a polymerization catalyst and is being maintained at a polymerizing temperature under such conditions that the drops of monomer rise or fall through the medium due primarily to the difference in density of the drops and the medium and the said drops subsequently collected as a separate phase in contact with but above or below the aqueous medium, and at the same time continuously circulating the aqueous medium in a substantially vertical plane, the movement of the aqueous medium above or near the point of introducing the drops of monomer preferably being in substantially the same direction as the movement of the said monomer drops. It has been found that by circulating the aqueous phase in the above-described manner one can effect a very rapid increase in the rate of movement of the monomer drops from the water into the monomer layer. The increased rate of passage into the monomer layer is particularly apparent where there is a tendency to form an emulsified layer at the interface. In these cases, the movement of the water phase removes the emulsified layer along the interface and leaves the said interface relatively clean for the penetration of the monomer drops. It has also been surprisingly found that by circulating the aqueous phase in the direction of the movement of the monomer drops, the monomer drops can be introduced at a much faster rate than was possible heretofore without having the liquid monomer dispersed into too fine drops. As a result of these features, the polymer can be formed in the aqueous medium at a greatly improved rate.

It has been further found that the circulation of the aqueous phase in the above-described manner eliminates the "dead spaces" within the reaction zone and the entire reaction medium has substantially the same degree of monomer saturation. The polymers formed by this process, therefore, have more uniform properties and can be used to prepare products having improved strength and flexibility.

The circulation of the aqueous phase in the substantially vertical plane may be accomplished in a great variety of different ways. It is preferably accomplished by maintaining at least a part of the space occupied by the aqueous medium as a closed circuit wherein the aqueous phase is allowed to circulate. This is preferably accomplished by employing a reaction chamber having one or more hollow or solid fixed barriers secured to and between any two opposite walls of the chamber whereby the aqueous phase can flow up between the barrier and the vessel wall, over the barrier, and then back between the barrier and the vessel wall to the point of beginning. The barrier or barriers may take any shape or size and may occupy any length of the vessel as long as the proper amount of aqueous phase is permitted to pass over and under the said barrier or barriers.

A few examples of suitable reaction vessels containing a fixed barrier are shown in Figs. I, II, III, IV and VI of the attached drawing. Fig. I represents a reaction vessel having a short fixed solid barrier in the upper part of the reaction vessel, and Fig. II represents a reaction vessel having a short fixed solid barrier in the lower part of the vessel. Figs. III and VI represent suitable vessels having a fixed solid barrier running through a greater part of the vessel. Fig. VI differs from Fig. III in having the distributing device at the top (for monomers heavier than water). Fig. IV represents a similar type of reaction vessel having a streamlined fixed barrier.

Fig. V represents a suitable reaction vessel having two fixed solid barriers attached to two opposite sides of the vessel. In this case, the distributing devices will be located in the two outer compartments and the aqueous phase will rise through the outer compartments and return through the inner compartment. Reaction vessels of this type may also be obtained by placing an open cylinder in the center of the reaction vessel and having the distributing device fitted annularly into the outer compartment. In this case, the water phase will rise through the outer compartment and return through the inner cylinder.

The exact size and shape of the reaction vessel may vary over a wide range depending chiefly on the desired advantages to be accentuated. For example, if it is desired to have a particularly superior rate of separation of the monomer drops into the monomer phase, the vessel should be so constructed as to have the area of the interface between the aqueous phase and the monomer phase in a large cross-section area. In addition, the vessel should be so constructed as to permit the aqueous phase to be circulated past all or a considerable part of the interface between the monomer layer and the aqueous phase. As indicated above, this permits the aqueous phase to remove the contaminating particles at the interface and allows a more rapid penetration of the interface by the monomer drops. An example of a reaction vessel possessing these features is shown in Fig. I. In the apparatus shown in this figure, the largest cross-sectional area is at the top where the interface between monomer layer 3 and aqueous phase 1 is located and the aqueous phase circulates upwards in the direction of the arrow and passes along the interface and then returns back to the point of beginning.

If one desires to eliminate all of the dead spaces in the reaction zone, it is also desirable to have the vessel constructed so as to have the device for introducing the monomer drops in the aqueous phase in the path of the circulating aqueous phase. An example of this type of reaction vessel is shown in Fig. II. In the apparatus shown in this figure, the aqueous phase circulates upwards in the direction of the arrow around the barrier and then back to and around distributing device 2.

The most superior results are obtained, of course, by employing vessels possessing all of the above-noted features, i. e., by having a large cross-section area near the location of the interface, having the horizontal part of the circuit of the aqueous phase pass along the interface, and by having the distributing device located in the path of the circulating aqueous phase. Figs. III to VI illustrate suitable vessels of this type. In Figs. III, IV and VI, the aqueous phase circulates by the distributing device 2, thence upwards or downwards as the case may be to the interface between the monomer phase and the aqueous phase, along the interface and thence back to the beginning. In Fig. V, the aqueous phase circulates by the distributing device 2 fitted annularly in the outer compartment, thence upwards in the outer compartment, along part of the interface and thence back through the inner compartment.

The circulation of the water phase may be brought about by the use of a pump but it is generally desirable to effect the circulation by means of the impulse caused by the movement of the monomer drops through the said aqueous phase. By introducing the monomer drops at a relatively high rate, one can obtain a very satisfactory rate of circulation of the aqueous phase. Care should be taken, however, not to utilize an excessive rate of introducing the monomer drops as such rates tend to decrease the size of the drops and impair the uniformity of the drops. This, of course, has a detrimental effect on the separation of the drops into the monomer phase. In general, the linear velocity of the monomer drops should not be more than 30 cm./sec. in excess of the velocity of the aqueous phase, and more preferably not more than 8 to 12 cm./sec. in excess of the velocity of the aqueous phase.

In the operation of the process of the invention, the reaction vessel is filled with the aqueous phase and then the unsaturated monomer passed into the aqueous phase in the form of drops and those that completely pass through the phase are then collected as a separate phase in contact with the aqueous medium. If the monomer is lighter than water, it will be introduced at the bottom of the vessel and will pass upwards through the aqueous medium, while if the monomer is heavier than the aqueous phase, the monomer will be introduced at the top and pass downwards through the aqueous medium.

The term "drops of monomer" as used throughout the specification and claims means liquid globules of monomer that are of such size that they are clearly visible as distinct entities to the unaided human eye and are thus distinguishable from monomer "droplets" present in the aqueous emulsion processes. The droplets in the emulsion are so small as to be subjected to the Brownian movement, while the drops of monomer in the present invention are so large as to be unaffected by this movement and move through the aqueous medium only by floating or sinking realized from the difference in the density of the drops and the aqueous medium. The drops preferably have a diameter of about 0.1 to 2 centimeters and more preferably from 0.1 to 1 centimeter.

The drops of the unsaturated monomer are preferably added to the aqueous medium through a distributing device containing a plurality of apertures through which the drops may enter the medium. The entrance aperture or apertures can have a diameter of say 0.2 to 20 mm. and are usually 2 to 10 mm. The entering means is placed at one end of the reaction chamber so that the drops flow away from it. At the vertically opposite end, the drops which have passed through the aqueous medium are collected into a separate phase in contact with the aqueous phase.

The amount of the aqueous medium through which the drops of monomer are allowed to rise or fall may vary over a wide range. In most cases, the medium is so regulated as to permit a recovery of a great part of the drops in a separate phase at the opposite end of the reaction chamber. As the monomer is being consumed in the polymerization reaction in the aqueous medium, there will be some diffusion, e. g., about 0.1% to about 10%, of the monomer into the medium per pass and the remaining part of the monomer will be recovered in each pass.

The monomer drops that pass through the aqueous medium are collected as a separate integral phase and then as further drops are collected a portion of that phase is withdrawn and recycled back to the point of supply of the drops.

The recycling of the monomer may be accomplished in any suitable manner but is preferably accomplished by means of an outside conduit so that the monomer may be cooled before it is introduced into the reaction zone. As indicated above, this cooling of the recycled monomer outside the reaction chamber offers a splendid opportunity for heat control of the polymerization reaction.

It is also advantageous in many cases to subject the circulating monomer to a washing operation before returning it to the polymerization zone. For this purpose, washing water gives good results and is easily effected by bringing the drops into contact with a column of water, conducting the drops through the water, and then collecting the passed drops into an integral layer for transportation to the reactor.

After some polymer, e. g., about 10% to 15%, and more preferably from 10% to 20%, has been formed, portions of the polymer-containing aqueous phase are removed from the reaction chamber. The removal of the aqueous phase is accomplished by withdrawing portions of the aqueous medium, preferably at about the rate at which the polymer is being formed, and then adding water, catalyst and other necessary components to make up for that withdrawn. The concentration of catalyst and other components are preferably maintained substantially constant in the aqueous phase. This is conveniently accomplished by using as feed stock a mixture of water, catalyst, etc., having the components in the desired proportions. If desired, however, one or all of the components may be added separately from the aqueous feed.

In removing portions of the aqueous phase, the best results are obtained by having the place or places of withdrawal located in a region free of moving monomer drops such as in the vertical side of the circuit carrying the aqueous phase away from the interface of monomer phase and water phase. If the distributing device is not located in the path of the circulating aqueous phase, it is generally desirable to remove the polymer-containing aqueous phase at positions located behind the distributing device. If the distributing device is located in the path of the circulating aqueous phase, the polymer-containing aqueous phase is preferably removed at positions just before the circulating phase reaches the distributing device.

The process of the invention may be better understood by considering how the process operates in several of the reaction vessels shown in the attached drawing. In the operation of the vessel shown in Figure I, the reaction vessel is partly filled with the desired aqueous phase 1 and then the monomer drops introduced at the bottom through distributing device 2. The monomer drops rise through the aqueous phase and those that complete the passage are collected in a monomer layer 3 at the top. The impulse of the monomer drops causes the aqueous phase to circulate upwards in the direction of the arrow. The water phase then passes by the interface between the monomer layer and the aqueous phase, returns down the other side and thence back to the middle of the opposite side where it is again carried upwards with the monomer drops. A portion of the monomer layer is recycled through line 4 by means of pump 5 to distributing device 2 at the bottom. Fresh monomer can be supplied through line 8 and the polymer-containing water phase can be discharged through line 9 with valve 10.

In the operation of the vessel shown in Fig. VI, the reaction vessel is partly filled with the desired aqueous phase 1 and then monomer drops introduced at the top through distributing device 2. The monomer drops then fall through the aqueous phase and are collected as a separate phase 3 at the bottom of the reaction vessel. The impulse of the monomer drops causes the aqueous phase to circulate downwards in the direction of the arrow. The water phase then passes by the interface between the monomer layer and the aqueous phase, returns up the other side and then back past the distributing device. A portion of the monomer layer is recycled through line 4 by means of pump 5 to distributing device 2 at the top. Fresh monomer can be supplied through line 8 and the polymer-containing water phase can be discharged through line 8 and the polymer-containing water phase can be discharged through line 9 with valve 10.

The monomers to be polymerized or copolymerized by the process of the invention comprise the substantially water-insoluble ethylenically unsaturated organic compounds. The expression "substantially water-insoluble" as used throughout the specification and claims in relation to the monomer to be polymerized, refers to those monomers which have at least some solubility in water so that some of the monomer may enter the aqueous medium but still have so little solubility in water that they are regarded as being relatively water-insoluble. Preferably, the monomers have a solubility in water at room temperature of from 0.1 part to 20 parts per 100 parts of water. Particularly preferred monomers are those having a solubility of from 0.1 part to 14 parts per 100 parts by weight of water.

The expression "ethylenically unsaturated," as used throughout the specification and claims, refers to those monomers possessing one or more polymerizable ethylenic groups in their molecule. Examples of such monomers include ethylene, maleic acid esters, tetrahaloethylene, butadiene-1,3, dimethyl-butadiene-1,3, piperylene, isoprene, chloroprene, styrene, alpha-methyl styrene, dichlorostyrene, vinyl phenol; esters of unsaturated acids, such as methyl acrylate, butyl acrylate, cyclohexyl 3-butenoate, hexyl acrylate, octyl acrylate, methyl methacrylate, butyl methacrylate, and propyl acrylate; the vinylidene halides such as vinylidene chloride and vinylidene bromide; the vinyl esters of inorganic acids such as vinyl chloride and vinyl bromide; the unsaturated nitriles, such as methacrylonitrile and acrylonitrile; the vinyl esters of monocarboxylic acids, such as vinyl acetate, vinyl caproate, vinyl chloroacetate, vinyl benzoate, and vinyl valerate; the vinyl esters of polycarboxylic acids, such as divinyl succinate, divinyl adipate, vinyl allyl phthalate, diallyl phthalate; the vinyl esters of the unsaturated acids, such as vinyl acrylate, vinyl crotonate, and vinyl methacrylate; the vinyl ethers, such as vinyl ethyl ether, vinyl butyl ether; and vinyl ketones, such as vinyl hexyl ketone, and vinyl octyl ketone.

Preferred monomers to be polymerized or copolymerized by the process of the invention comprise the vinylidene monomers containing a polymerizable $CH_2=C=$ group and no other polymerizable group, such as vinyl chloride, vinylidene chloride, vinyl butyrate, ethyl acrylate, styrene, methyl-styrene, allyl acetate, allyl butyrate, acrylonitrile, methacrylonitrile, isobutylene, and the like. Especially preferred are those monomers having a molecular weight below about 225.

Of special interest, particularly because of the fine quality of the polymers that may be prepared therefrom by the process of the invention, comprise the members of the group consisting of ethylene, vinyl chloride, vinylidene chloride, butadiene, styrene, alpha-methyl styrene, acrylonitrile, methacrylonitrile, the alkyl esters of acrylic acid, and the vinyl esters of the alkanoic acids.

The composition of the aqueous medium to which the monomer is added may vary depending chiefly on the form in which the resulting polymer is desired. If the polymer is desired in the form of a stable emulsion, the medium may contain an emulsifying agent and a suitable catalyst. If the mixture is desired as a dispersion from which the polymer may later settle out, the medium may contain a water-soluble catalyst and small quantities of dispersing agents.

Catalysts used for the emulsion polymerization may be any of the polymerization catalysts that are known to be used for this purpose, such as persulfuric acid, peracetic acid, percarbonic acid, perphosphoric acid, perphthalic acid, the persalts, such as potassium persulfate, the peresters, such as O,O-tert-butyl O-ethyl monopermalonate, the peroxides, such as hydrogen peroxide, and the like. Other catalysts can be used, such as benzoyl peroxide, tertiary butyl perbenzoate, acetyl benzoyl peroxide, lauryl peroxide, acetone peroxide, etc., if they form part of the well known redox systems of polymerization catalyzers, especially when operating at below about 35° C. Suitable catalyst systems are also combinations of oxygen and salts of sulfurous acid. The water-soluble polymerization catalysts, and more preferably the water-soluble peroxide polymerization catalysts, are the more desirable catalysts to be used for this type of process.

The preferred catalysts to be used for the suspension-type polymerization reaction include the above-described water-soluble catalysts, such as persulfuric acid, peracetic acid, percarbonic acid, perphosphoric acid, potassium persulfate, hydrogen peroxide, and the like, and mixtures thereof.

The amount of the above-described catalysts to be used will vary over a wide range depending upon their type and desired rate of polymerization. In most instances, the amount of catalyst will vary from 0.1% to 5%, and more preferably from 0.1% to 1%, wherein the percentages are by weight based on the aqueous phase.

Dispersing agents that may be used in the process may be exemplified by the following: finely divided clay, talc, barium sulfate, and tricalcium phosphate, methyl cellulose, polyfluoroalkanoic acids, such as dodecafluoroheptaonic acid, pentadecafluorooctanoic acid, salts of these acids with saturated alkylamines, phosphoric acid esters of polyfluoroalkanols, and the like, and mixtures thereof.

Emulsifying agents used in the aqueous medium may be any of the known ionic or non-ionic type emulsifying materials. Suitable materials include sodium and/or potassium myristate, laurate, palmitate, oleate, stearate, rosinate and/or hydroabietate; or alkali metal alkyl or alkylene sulphates, or sulphonates, such as sodium and/or potassium lauryl sulfate, cetyl sulfate, oleyl sulphonate, stearyl sulphonate, sulphonated Turkey red oil, sulphonated mineral oils, etc., as well as ammonium or ethanolamine salts thereof; salts of higher amines and non-ionic emulsifiers, such as described in U. S. 2,322,820. In all cases, it is preferred that the hydrocarbon radical of the emulsifying agent contains 10 to 20 carbon atoms. The amount of the emulsifying agents used may vary over a wide range. Best results are obtained when sufficient amount is present in the aqueous medium that the suspension of polymer is substantially stable. In general, the concentration of emulsifying agent falls within the range of about 0.05 to 2% of the aqueous medium. With an ion-active emulsifier, there is employed in general between 0.01 to 0.2, and more particularly between 0.01 and 0.06 gram equivalents of emulsifier per kilogram of polymer ultimately present in the dispersion. A gram equivalent is the number of grams which is equal to the molecular weight divided by the number of positive (or negative) elementary electric charges formed on ionization of a molecule. Thus, in using sodium cetyl sulphonate as emulsifying agent for production of an aqueous dispersion containing 20% polymer, there is used a starting aqueous medium containing about 0.08 to 1.6%, particularly 0.16 to 0.5% of the emulsifying agent.

Although the temperature of operation in the polymerizing zone can vary during the course of the polymerization, it is preferred to maintain it substantially constant. This is conveniently accomplished by cooling the circulating monomer phase. However, in starting up the polymerization, it may be necessary to apply heat until the polymerization reaction is under way. Once polymerization has started, the temperature is kept constant by cooling, since the polymerization reaction is exothermic. A broad range of temperature is suitable for conducting the polymerization, but in general temperatures of about −20° C. to 90° C. are used, and very good results are obtained with the aqueous medium at about 15° C. to 70° C.

Since the process operates with liquid monomer, at least sufficient pressure is employed to achieve this state. In cases where the operating temperature is below the boiling point of the monomer, ordinary atmospheric pressure may be used. With operations at temperatures above the boiling point, it is, of course, necessary that sufficient superatmospheric pressure be used that the monomer is liquid, as is the case, for example, in polymerizing vinyl chloride at 25° C. Higher pressures, e. g., from 1 to 5 atmospheres above that needed to keep the monomer in the liquid state, may be used if desired.

The presence of oxygen generally tends to inhibit the rate of polymerization and, therefore, the reaction medium is preferably kept out of contact with oxygen by use of a closed apparatus and the reactor is purged free of oxygen in starting up.

The method of recovering the polymer will vary depending on the type of medium used. If the polymer is formed as a stable emulsion, the polymer particles may be recovered by any coagulating means, such as freezing or addition of coagulating agents. If the polymer is formed as a less stable dispersion, the particles may be recovered by filtration, extraction, and the like.

Apart from the preparation of homopolymers, the process of the invention is also very suitable for copolymerization. By this is meant the joint polymerization of two or more monomers. The monomers used for the preparation of the copolymers may be any mixture of the above-described substantially water-insoluble monomers. The monomers may be combined in any desired ratio, but, in general, the mixtures of monomers are employed wherein at least 1%, and more preferably 5%, of each is present in the drops introduced into the water phase.

The process is particularly adapted for use in preparing copolymers of the homogeneous type, i. e., copolymers consisting of macromolecules which contain the monomer molecules in the same ratio. In general different monomers, though they are present in the same concentration, are used up at different speeds in a copolymerization. The ratio in which monomers are present in the reaction consequently shows a tendency to change. An alteration in the ratio of the monomer concentration in the reaction mixture in turn results in the composition of the macromolecules formed being subject to alteration, so that the copolymer becomes what is called heterogeneous.

It is known that in order to obtain homogeneous copolymer, the ratio of the monomers in the reaction mixture must be kept constant, which can best be attained by admixing suitable quantities of all participating monomers, or by admixing suitable quantities of all monomers with the exception of the monomer which in proportion to the total quantity of that particular monomer present, is consumed most slowly. In the process according to the invention, this admixture can take place most efficiently in the monomer circulation line. Preferably a reservoir will be fitted in the circulation line in this case as shown in the attached drawing. The admixture of monomer then takes place preferably in this reservoir or in the part of the circulation line in front of the reservoir. When applying a reservoir the monomer can be admixed both continuously and intermittently.

The following examples are given for the purpose of illustrating the inventive improvement, but it is to be understood that the invention is not to be construed as limited to details described therein.

Example I

The apparatus used in this experiment was similar to that shown in Fig. VI. It was made of a glass tube with a circular cross-section and a diameter of 4 cm. The vertical parts of the circuit were 60 cm., the horizontal parts 20 cm. in length. The corners were rounded. The distributing device for the monomer consisted of a single glass tube pointing downwards with an inner diameter of 6 mm. In addition to the pump, a reservoir for the monomer was incorporated in the connecting line between the bottom of the apparatus and the distributing device.

The lowest horizontal part of the apparatus was filled halfway with vinylidene chloride. The remaining space in the circuit was filled with water containing 0.5% of a mixture of sodium alkyl sulphonates (sodium mersolate), 0.3% of potassium persulphate, 0.15% of sodium bisulphite and 0.15% sodium bicarbonate. The reservoir in the connecting line was also filled with vinylidene chloride. The temperature was raised to 28° C. and the circulating pump was set in motion.

The circulation of the aqueous phase was effected by the movement of the monomer drops. The vinylidene chloride was originally introduced into the water phase at the rate of 10 liters per hour. After the concentration of polymer in the water phase had risen to 1%, this rate was increased to 40 liters per hour.

The distribution of the droplet size of the monomer remained practically homogeneous. The separation of the droplets at the bottom of the circuit proceeded very rapidly and smoothly. The rate of polymer formation was 80 parts per liter of water phase per hour. The water phase circulated once in 10–20 sec.

After the concentration of the polymer had risen to 20%, the process was made continuous. By supplying fresh water phase and discharging the polymer suspension formed, the concentration of polymer was kept at 20%. The vinylidene chloride in the reservoir was replenished as required.

The polymer obtained by this process had excellent physical properties and was superior to a polymer prepared without circulating of the water phase.

Example II

This example illustrates the preparation of a homogeneous copolymer of vinylidene chloride and ethyl acrylate using the apparatus described in Example I.

The lower horizontal part of the apparatus is filled with a mixture of vinylidene chloride and ethyl acrylate in a ratio of 80:20 by weight and the remaining space in the circuit filled with a water phase containing 0.5% ammonium persulfate and 0.1% sodium bicarbonate, and 0.5% sodium mersolate. The reservoir in the connecting line is also filled with a mixture of monomers in the above-described ratio.

The mixture of monomers is circulated by means of a pump and passed through the water phase from the top to the bottom. The temperature of the system is raised to 30° C. by applying heat at the heat exchanger. After the polymerization process has started, the temperature is maintained at 30° C. by cooling with cold water in the heat exchanger.

After the concentration of copolymer in the water phase has risen to 30% by weight, fresh water phase is introduced through a conduit discharging at a point halfway up the reactor, while the copolymer suspension formed is discharged at the top. The feed of fresh water phase is regulated in such a manner that the concentration of the copolymer in the water phase is maintained at 20%.

The quantity of the circulating mixture of monomers is kept up to standard by replenishing with vinylidene and ethyl acrylate in a ratio of 80:20.

The distribution of the droplet size of the mixture of monomers remained practically homogeneous. The separation of the droplets at the bottom of the circuit proceeded rapidly and smoothly. The water phase circulated once in 10–20 sec.

The polymer obtained in this process has improved physical properties over a similar homogeneous copolymer of vinylidene chloride and ethyl acrylate produced without circulating the aqueous phase.

Other homogeneous copolymers having improved properties are obtained by replacing the vinylidene chloride-ethyl acrylate in the above process with equivalent proportions of each of the following monomer mixtures; vinylidene chloride-methyl methacrylate, vinylidene chloride-methacrylonitrile and vinylidene chloride-vinyl acetate.

Example III

This example illustrates the homopolymerization of styrene using an apparatus shown in Fig. III.

The apparatus used is similar to that described in Example I with the exception that the distributing device is at the bottom so that the monomer drops may pass upwards through the aqueous phase. In addition to the pump, a reservoir for the monomer is incorporated in the connecting line between the bottom of the apparatus and the distributing device.

The lower part of the apparatus is filled with a water phase containing 0.2% of sodium mersolate, 0.1% potassium persulphate, 0.25% dodecyl mercaptan and 0.07% sodium hydroxide. The remaining space and the connecting line is filled with styrene. The temperature is raised to 40° C. and the circulating pump set in motion.

The circulation of the water phase in this case is also brought about by the movement of the monomer drops. The styrene is originally introduced into the water at the rate of about 10 liters per hour. After the concentration of polymer in the water phase had risen to 1%, this rate is increased to 40 liters per hour.

The distribution of the droplet size of the monomer remains practically homogeneous. The separation of the droplets at the bottom of the circuit proceeds rapidly and smoothly. The water phase circulates once in about 10–20 sec.

After the concentration of polymer has risen to about 20%, the process is made continuous. By supplying fresh water phase and discharging the polymer suspension formed, the concentration of polymer is kept at 20%. The styrene in the reservoir is replenished as required.

The polymer obtained by this process has excellent physical properties and is superior to a similar polymer prepared without circulating the water phase.

Other polymers having improved properties may be obtained by replacing styrene in the above-described process with each of the following: acrylonitrile, methacrylonitrile and vinyl chloride.

We claim as our invention:

1. In a process for producing a polymer of at least one substantially water-insoluble ethylenically unsaturated compound in an aqueous medium wherein liquid drops of the said ethylenically unsaturated compound are passed through a liquid aqueous medium whcih is maintained at a polymerizing temperature and contains a water-soluble polymerization catalyst and dispersed polymer of the ethylenically unsaturated compound suspended therein by the presence of sufficient emulsifying agent that the polymer emulsion is substantially stable, and a portion of the monomer on the surface of the drops goes into the aqueous medium and is polymerized, said passage of the drops of the ethylenically unsaturated compound through the aqueous medium being due primarily to the difference in density of the said drops and medium and wherein all of the drops that pass through the aqueous phase are collected as a separate phase in contact with the said aqueous medium, the improvement which comprises maintaining the space filled with the aqueous phase as a closed circuit with the horizontal part of the circuit passing along the interface of the aqueous phase and collected monomer phase wherein the aqueous phase is allowed to continuously circulate around the closed circuit in a substantially vertical plane.

2. The improvement as defined in claim 1 wherein the distributing device through which the monomer drops are introduced into the aqueous medium is incorporated into the circuit.

3. The improvement as defined in claim 1 wherein the unsaturated compound is vinylidene chloride.

4. The improvement as defined in claim 1 wherein the speed of the monomer droplets through the aqueous medium exceeds the linear rate of the water phase by no more than 30 cm. per second.

5. The improvement as defined in claim 1 wherein the circulation of the aqueous phase is due primarily to the movement of the monomer droplets.

6. The improvement as defined in claim 1 wherein the unsaturated compound is vinyl chloride.

7. The improvement as defined in claim 1 wherein the unsaturated compound is styrene.

References Cited in the file of this patent

UNITED STATES PATENTS

| | | |
|---|---|---|
| 2,179,040 | Heuer | Nov. 7, 1939 |
| 2,326,326 | Breedis | Aug. 10, 1943 |
| 2,566,567 | Hutchinson | Sept. 4, 1951 |
| 2,618,626 | Van Dijk et al. | Nov. 18, 1952 |